United States Patent [19]

Koyama et al.

[11] Patent Number: 5,236,911

[45] Date of Patent: Aug. 17, 1993

[54] METHACRYLIC RESIN COMPOSITION

[75] Inventors: Teruhisa Koyama; Hideaki Matsuura, both of Niihama, Japan

[73] Assignee: Sumitomo Chemical Company, Limited, Osaka, Japan

[21] Appl. No.: 685,080

[22] Filed: Apr. 15, 1991

[30] Foreign Application Priority Data

Apr. 16, 1990 [JP] Japan .................................. 2-100793
Mar. 14, 1991 [JP] Japan .................................. 3-049434

[51] Int. Cl.$^5$ .............................................. C08L 33/12
[52] U.S. Cl. ........................................ 525/71; 525/82; 525/85
[58] Field of Search ............................ 525/82, 71, 85

[56] References Cited

U.S. PATENT DOCUMENTS

| | | | |
|---|---|---|---|
| 3,793,402 | 2/1974 | Owens | 525/81 |
| 4,180,529 | 12/1979 | Hofmann | 525/85 |
| 4,385,152 | 5/1983 | Boyack et al. | 524/460 |

FOREIGN PATENT DOCUMENTS

| | | |
|---|---|---|
| 53-7792 | 1/1978 | Japan . |
| 54-99190 | 8/1979 | Japan . |
| 56-177712 | 12/1981 | Japan . |
| 58-180413 | 10/1983 | Japan . |
| 59-10745 | 3/1984 | Japan . |
| 61-60749 | 3/1986 | Japan . |

OTHER PUBLICATIONS

Database WPIL, No82-55935E, Derwent Publications Ltd, London, GB: & JP-A-59010745 (Asahi Chemical Ind KK) Mar. 10, 1984.

*Primary Examiner*—John Kight, III
*Assistant Examiner*—Jeffrey Culpeper Mullis
*Attorney, Agent, or Firm*—Stevens, Davis, Miller & Mosher

[57] ABSTRACT

The present invention provides a methacrylic resin composition which comprises a mixture of 20–99% by weight of a methacrylic resin and 1–80% by weight of a methacrylic two-layer polymer comprising the following inner layer (a) and outer layer (b) and having the following requirements (c)–(e):

(a) the inner layer being obtained by polymerizing 90–99.9% by weight of a monofunctional monomer which is mainly composed of methyl methacrylate and 0.1–10% by weight of a polyfunctional monomer having at least two carbon-carbon double bonds in one molecule, (b) the outer layer being obtained by polymerizing a monofunctional monomer mainly composed of methyl methacrylate in the presence of the inner layer, (c) the weight ratio of the inner layer and the outer layer being 1:9–9:1, (d) the glass transition temperature being 50–120° C., and (e) the average particle size being 200–5000 Å.

This composition is excellent in processability, heat distortion resistance, mechanical properties and solvent resistance.

5 Claims, No Drawings

METHACRYLIC RESIN COMPOSITION

BACKGROUND OF THE INVENTION

FIELD OF THE INVENTION

The present invention relates to a methacrylic resin composition and more particularly, to a methacrylic resin composition excellent in processability, heat distortion resistance, mechanical properties and solvent resistance.

DESCRIPTION OF THE RELATED ART

Methacrylic resins are used in a wide variety of fields such as automobile parts, electrical parts, industrial parts, harberdasheries, and the like because of their excellent characteristics such as transparency, weathering resistance, mechanical properties, and processability.

However, their uses are restricted since they have defects in that when they are allowed to contact with alcohols such as methanol and ethanol and organic solvents such as paint thinner, crazes or cracks occur, and not only beautiful appearance which is one of the inherent characteristics of methacrylic resins is lost, but also the mechanical properties deteriorate.

Hitherto, as an approach to improve the solvent resistance, the methacrylic resins obtained by copolymerization of methyl methacrylate and (meth)acrylic acid higher alkyl esters are proposed in Japanese Patent Kokai (Laid-Open) Nos. 53-7792 and 54-99190.

Japanese Patent Kokoku (Post Exam. Publn.) No. 59-10745 discloses a solvent resistant methacrylic resin composition prepared by dispersing in a methacrylic resin acrylic rubber particles which have a particle size of 200-900 Å and which comprise as a first layer a polymer of a monomer mainly composed of methyl methacrylate and a polyfunctional grafting agent, as a second layer a polymer of a monomer mainly composed of alkyl acrylate and a polyfunctional crosslinking agent, and as a third layer a polymer of a monomer composed of at least 80% by weight of methacrylate.

Japanese Patent Kokai (Laid-Open) No. 61-60749 discloses a solvent resistant methacrylic resin composition prepared by dispersing a rubber obtained by copolymerizing an alkyl acrylate and a butadiene unit in methacrylic resin.

SUMMARY OF THE INVENTION

However, the known method which comprises copolymerizing methyl methacrylate with (meth)acrylic acid higher alkyl ester is insufficient for improvement of solvent resistance.

Furthermore, the known methacrylic resin composition in which the rubber component is dispersed is improved in impact strength and in solvent resistance to some extent, but the improvement is still insufficient.

The object of the present invention is to provide a methacrylic resin which is imparted with the solvent resistance without damaging the processability, the heat distortion resistance and the mechanical properties which are inherent characteristics of methacrylic resins.

The present invention is a methacrylic resin composition comprising a mixture of 20-99% by weight of a methacrylic resin and 1-80% by weight of a methacrylic polymer having two-layer structure specified by the following (a)-(e):

(a) the inner layer obtained by polymerizing 90-99.9% by weight of a monofunctional monomer which is mainly composed of methyl methacrylate and 0.1-10% by weight of a polyfunctional monomer having at least two carbon-carbon double bonds in one molecule, (b) the outer layer obtained by polymerizing a monofunctional monomer mainly composed of methyl methacrylate in the presence of the inner layer, (c) the weight ratio of the inner layer and the outer layer being 1:9-9:1, (d) the glass transition temperature being 50-120° C., and (e) the average particle size being 200-5000 Å.

DESCRIPTION OF THE INVENTION

The methacrylic resin used in the present invention includes rigid methacrylic resins obtained by polymerizing at least 70% by weight of methyl methacrylate with other ethylenically unsaturated monomer copolymerizable with methyl methacrylate or rubber modified methacrylic resins which comprise the above-mentioned rigid methacrylic resin which contains acrylic rubber or butadiene rubber.

The other copolymerizable ethylenically unsaturated monomers in the rigid methacrylic resin include, for example, alkyl acrylates the alkyl group of which has 1-8 carbon atoms; aromatic vinyl monomers represented by styrene; acrylonitrile; and alkyl methacrylates the alkyl group of which has 2-8 carbon atoms.

The rigid methacrylic resins are produced by known processes such as an emulsion polymerization, suspension polymerization and bulk polymerization of the above-mentioned monomer mixtures according to a batch method or a continuous method.

As the acrylic rubbers used in the rubber modified methacrylic resins, there are known various acrylic rubbers. Examples thereof are crosslinked elastic materials obtained by copolymerizing alkyl acrylates, styrene or styrene derivatives and polyfunctional monomers having at least two carbon-carbon double bonds in one molecule; products obtained by further grafting a monomer mainly composed of methyl methacrylate on the above crosslinked elastic material; and products obtained by stepwise polymerization of a layer comprising an alkyl acrylate, styrene or derivatives thereof and the above polyfunctional monomer and a layer mainly composed of methyl methacrylate as disclosed in Japanese Patent Kokoku (Post Exam. Publn.) Nos. 55-27576 and 59-36645 and Japanese Patent Kokai (Laid-Open) No. 55-94917.

Further, butadiene rubbers include, for example, those which are obtained by grafting methyl methacrylate, an alkyl acrylate or styrene on polybutadiene and those which are obtained by stepwise polymerization of a layer obtained by polymerization of a monomer containing butadiene and a layer mainly composed of methyl methacrylate as disclosed in Japanese Patent Kokoku (Post Exam. Publn.) No. 55-27576. These polymerizations may be carried out by known processes such as emulsion polymerization, suspension polymerization and bulk polymerization.

Content of the rubber component in the rubber modified methacrylic resin used in the present invention is 3-60% by weight, preferably 5-50% by weight. If content of the rubber component is less than 3% by weight, impact strength is low and thus, effect obtained by adding the rubber component is not recognized and if it is more than 60% by weight, mechanical properties such as heat resistance and flexural modulus deteriorate.

The rubber modified methacrylic resin can be obtained by melt mixing the rubber component with a rigid methacrylic resin or by polymerizing, a monomer component containing at least 70% by weight of methyl methacrylate in the presence of the rubber component.

The methacrylic polymer having the two-layer structure of the present invention comprises an inner layer as a core and an outer layer.

The inner layer comprises a crosslinked polymer obtained by polymerizing 90–99.9% by weight of a monofunctional monomer which is mainly composed of methyl methacrylate and 0.1–10% by weight, preferably 0.2–5% by weight of a polyfunctional monomer having at least two carbon-carbon double bonds without conjugated double bond in one molecule.

The inner layer improves hardness, heat resistance and solvent resistance of the methacrylic resin composition.

If the content of the polyfunctional monomer is less than 0.1% by weight or more than 10% by weight, the effect to improve solvent resistance is small.

The monofunctional monomer mainly composed of methyl methacrylate is that which contains at least about 60% by weight of methyl methacrylate and other above-mentioned ethylenically unsaturated monomer copolymerizable therewith.

As examples of the polyfunctional monomer, mention may be made of ethylene glycol dimethacrylate, ethylene glycol diacrylate, 1,3-butylene glycol dimethacrylate, trimethylolpropane triacrylate, pentaerythritol tetracrylate, divinylbenzene triallylcyanurate, allyl cinnamate, allyl methacrylate, allyl acrylate, allyl sorbate, diallyl phthalate and diallyl maleate. Preferred are allyl methacrylate, allyl acrylate, allyl cinnamate, and 1,3-butylene glycol dimethacrylate.

The outer layer of the two-layer polymer is formed of a non-crosslinked polymer of a monofunctional monomer mainly composed of methyl methacrylate.

This outer layer may be a single layer or, if necessary, comprises plural layers. For example, the plural layers may be such that the molecular weights of the layers gradually decrease from the innermost layer to the outermost layer.

The monofunctional monomer mainly composed of methyl methacrylate is one which comprises at least about 70% by weight of methyl methacrylate and the above-mentioned other copolymerizable ethylenic unsaturated monomer.

The outer layer enhances compatibility of the rigid methacrylic resin and the two-layer polymer and has the effects to inhibit generation of craze caused by stress of the methacrylic resin composition and reduction of mechanical strength.

The ratio of the inner layer and the outer layer in the two-layer polymer is 1:9–9:1.

If the amount of the inner layer is too small, not only is the solvent resistance insufficient, but also the flowability decreases to cause deterioration of processability.

If the amount of the outer layer is too small, craze is generated due to stress or mechanical strength decreases.

The glass transition temperature of the two-layer polymer is preferably as high as possible for maintaining mechanical properties and heat resistance of the methacrylic resin composition and is at least 50° C., preferably at least 80° C. The upper limit is about 120° C.

The glass transition temperature increases with increase in the amount of the methyl methacrylate among the constituting monomers and so, can be suitably adjusted within the above-mentioned range depending on the kind of the copolymerizable other ethylenically unsaturated monomer.

The particle size of the two-layer polymer is required to be 200–5000 Å, preferably 1000–4500 Å.

If the particle size is less than 200 Å, the flowability of the methacrylic resin composition is very low and if it is more than 5000 Å, surface roughening occurs on molded products.

The two-layer polymer used in the present invention can be easily obtained by emulsion polymerization of a consecutive two-stage polymerization process.

That is, the inner layer is firstly produced by emulsion polymerization and consecutively components of the outer layer are emulsion polymerized in the presence of the inner layer.

The polymerization temperature is 30–120° C. and the polymerization time varies depending on kinds of polymerization initiator and emulsifier used, but is usually 0.5–7.0 hours for respective polymerization stages.

The ratio of monomer/water is about 1/20–1/1.

If necessary, a known chain transfer agent such as mercaptan may be added to the monomers constituting the outer layer.

The emulsifier may be any of generally used ones and has no special limitation. Examples thereof are long-chain alkylcarboxylates, alkyl sulfosuccinates, and alkylbenzenesulfonates.

The particle size of the two-layer polymer may be adjusted by emulsification conditions such as concentration of emulsifier which are known techniques of an emulsion polymerization.

Use of excess emulsifier hinders formation of the two-layer structure and this is not preferred.

The particle size can be measured in the form of latex after completion of polymerization by known methods such as a microscope observation method, a light absorbing method, a static light scattering method, a dynamic light scattering method, and a centrifugal settling method.

Known polymerization initiators can be used.

For example, there may be used inorganic initiators such as persulfates and pernitrates, redox initiators comprising combination of the inoroganic initiators with sulfites, redox initiators such as organic hydroperoxides-ferrous salts and organic hydroperoxides-sodium formaldehyde sulfoxylates, and initiators such as benzoyl peroxide and azobisisobutyronitrile.

The methacrylic resin composition of the present invention can be obtained by mixing 20–99% by weight of a rigid or rubber modified methacrylic resin and 1–80% by weight of a methacrylic two-layer polymer. Preferably, the amount of the rigid or rubber modified methacrylic resin is 50–95% by weight and amount of the two-layer polymer is 5–50% by weight. If the amount of the two-layer polymer is less than 1% by weight, the effect to improve solvent resistance is very small and if it is more than 80% by weight the flowability deteriorates and processability decreases.

The rigid or rubber modified methacrylic resin can be mixed with the two-layer polymer by any methods by which these can be uniformly mixed and all of usual methods for mixing resins can be employed.

For example, it comprises mixing pellets or powders of the rigid or rubber modified methacrylic resin with the two-layer polymer, or, pellets or powders of the rigid methacrylic resin with the rubber component and the two-layer polymer by a v-type blender, Henschel mixer and the like and then melt mixing them at 150–300° C. by mixing rolls, screw-type extruder and the like.

In this case, if necessary, stabilizer, lubricant, plasticizer, dye and pigment and filler may also be added.

Furthermore, the methacrylic resin composition can also be obtained by dispersing the two-layer polymer in the monomer or syrup thereof and after that bulk or suspension polymerizing them.

Further examples include a method which comprises blending a latex of the two-layer polymer with a latex of the rubber component obtained by emulsion polymerization in the step of preparing rubber modified methacrylic resin, separating the resin component and melt mixing the resin with the rigid methacrylic resin and a method which comprises blending the above two latices with a latex of the rigid methacrylic resin and then separating and taking out the resin component.

The present invention provides a composition excellent in the solvent resistance without damaging the processability, the heat resistance, and the mechanical properties of rigid methacrylic resins or rubber modified methacrylic resins. The composition is further improved in solvent resistance over conventional methacrylic resin compositions which comprise a multi-layer polymer composition containing an acrylic rubber component.

DESCRIPTION OF THE PREFERRED EMBODIMENTS

The present invention will be explained in detail by the following examples.

The following abbreviations are used in the examples.

| | |
|---|---|
| Methyl methacrylate | MMA |
| Ethyl acrylate | EA |
| n-Butyl acrylate | BA |
| Allyl methacrylate | AMA |
| Styrene | ST |
| Cumene hydroperoxide | CHP |
| Sodium dodecylbenzenesulfonate: | NaDDBS |

Properties shown in examples were measured by the following methods.

Solvent resistance: A dumbbell of 126.5×12.7×3.3 mm made by injection molding was applied with a load at a position at a distance of 66 mm from a supporting point so that a stress of 150 kg/cm$^2$ was applied to the surface of the supporting point according to the cantilever beam method. Isopropyl alcohol was applied onto the surface of the supporting point and time required for generation of crazes was measured and the solvent resistance was shown by average time (second) obtained by measurement of three times.

Melt flow index (MI): This was measured by the method of ASTM-D1238 at 230° C. for 10 minutes under a load of 3.8 kg.

Tensile strength: This was measured in accordance with ASTM-D638.

Izod impact strength: This was measured in accordance with ASTM-D 256 on notched test piece at 23° C.

Heat resistance: Heat distortion temperature (HDT) was measured in accordance with ASTM-D648.

Particle size: This was measured by micro particle size analyzer (BI-90S manufactured by Nikkiso Co.).

Surface state of molded product: The resin composition was injection molded into a plate of 60×60 ×3 mm and the plate having no roughened surface is shown by ο and the plate having roughened surface is shown by x.

Glass transition temperature: This was measured by a differential scanning Calorimeter (DS-10 manufactured by Seiko Denshi Kogyo Co.).

As processing apparatus, a single screw extruder of 20 mm diameter manufactured by Toyo Seiki Seisakusho Ltd. was used for melt mixing and M-90 manufactured by Meiki Seisakusho Ltd. was used for injection molding.

It should be understood that we intend to cover by the appended claims all modifications falling in the true spirit and scope of our invention.

EXAMPLE 1

(a) Preparation of Two-Layer Polymer 1740 g of deionized water, 30 g of NaDDBS, and 0.6 g of Rongalit were charged in a 5 liter glass reaction vessel provided with a condenser and stirred under nitrogen stream. Thereafter, 358 g of MMA in which 0.1% of CHP was dissolved, 15 g of EA and 7.5 g of AMA were charged therein.

The temperature was elevated to 70° C. with stirring and stirring was continued for 45 minutes to complete polymerization of the inner layer.

Subsequently, thereto was added a mixture of 1430 g of MMA in which 0.1% of CHP was dissolved and 55 g of EA over a period of 80 minutes.

After completion of addition, the content was kept for further 60 minutes to complete polymerization of the outer layer.

The particles size of this polymer was 1380 Å.

The resulting latex was introduced into 0.5% aqueous aluminum chloride solution to coagulate the polymer.

This was washed with warm water 5 times and dried to form a two-layer polymer.

The resulting two-layer polymer had a glass transition temperature of 104° C.

(b) Preparation of the Methacrylic Resin Composition

A rigid methacrylic resin powder having a molecular weight of 90000 obtained by suspension polymerization of 96% by weight of methyl methacrylate and 4% by weight of ethyl acrylate was mixed with the two-layer polymer obtained in the above (a) at the ratio as shown in Table 1 by a Henschel mixer. Then, the mixture was melt mixed by a vented screw type extruder at a cylinder temperature of 220–270° C. to pelletize it.

The pellets were dried at 80° C. for 5 hours and then were molded into a given dumbbell at 240° C. by an injection molding machine and this dumbbell was evaluated.

The results of evaluation are shown in Table 1.

EXAMPLES 2 and 3

Example 1 was repeated except that the rigid methacrylic resin powder and the two-layer polymer were used at the ratio as shown in Table 1 in preparation of the methacrylic resin composition in (b).

The results are shown in Table 1.

COMPARATIVE EXAMPLE 1

Example 1 was repeated using only the rigid acrylic resin powder and the test piece was evaluated in the same manner as in Example 1.

The results are shown in Table 1.

COMPARATIVE EXAMPLES 2 and 3

Methacrylic resin compositions were prepared in the same manner as in Examples 2 and 3 except that an acrylic rubber modified three-layer polymer (glass transition temperature −11° C.) of about 900 Å in particle size which was prepared by the process of Example 1 of Japanese Patent Kokoku (Post Exam. Publn.) No. 59-10745 was used in place of the two-layer polymer in (a) of Example 1.

thereto over a period of 30 minutes. After completion of addition, the content was kept for a further 30 minutes to complete the polymerization of the outer layer. This polymer had a particle size of 1120 Å.

The resulting latex was introduced into a 0.5% aqueous aluminum chloride solution to coagulate the polymer. This was washed with warm water 5 times and then was dried to obtain a two-layer polymer.

The resulting two-layer polymer had a glass transition temperature of 104° C.

(b) Preparation of Methacrylic Resin Composition

The procedure of (b) in Example 1 was repeated except that the above two-layer polymer was used and the mixing ratio was as in Example 3. The results are shown in Table 1.

TABLE 1

|  | Rigid methacrylic resin (wt %) | Two-layer polymer (wt %) | Solvent resistance (sec) | MI (g/10 min) | Tensile strength (kg/cm$^2$) | HDT (°C.) |
| --- | --- | --- | --- | --- | --- | --- |
| Example 1 | 90 | 10 | 37 | 4.9 | 671 | 103 |
| Example 2 | 80 | 20 | 189 | 2.9 | 629 | 102 |
| Example 3 | 60 | 40 | 497 | 0.8 | 702 | 103 |
| Example 4 | 60 | 40 | >1500 | 0.5 | 703 | 102 |
| Comparative Example 1 | 100 | 0 | 25 | 6.6 | 648 | 103 |
| Comparative Example 2 | 80 | *20 | 15 | 2.6 | 515 | 99 |
| Comparative Example 3 | 60 | *40 | 1200 | 0.5 | 311 | 94 |

*Acrylic rubber modified three-layer polymer

The results are shown in Table 1.

EXAMPLE 4

(a) Preparation of Two-Layer Polymer 1740 g of deionized water, 30 g f NaDDBS, and 0.6 g of Rongalit were charged in a 5 liter reaction vessel made of glass and provided with a condenser and were stirred under nitrogen stream. Thereafter, 358 g of MMA in which 0.1% of CHP was dissolved, 15 g of EA and 7.5 g of AMA were further charged therein.

Successively, the temperature was elevated to 70° C. with stirring and stirring was continued for 45 minutes to complete polymerization of the inner layer.

Subsequently, a mixture of 1094 g of MMA in which 0.1% of CHP was dissolved and 44 g of EA was added thereto over a period of 90 minutes. After completion of addition, the content was kept for 60 minutes to polymerize a part of the outer layer. Furthermore, a mixture of 358 g of MMA in which 0.1% of CHP was dissolved, 15 g of EA, and 1.1 g of laurylmercaptan was added

EXAMPLES 5 AND 6 AND COMPARATIVE EXAMPLE 4

Two-layer polymers having a particle size as shown in Table 2 were prepared in the same manner as in (a) of Example 1 except that emulsifying conditions were changed.

Thereafter, Example 3 was repeated.

The results are shown in Table 2.

TABLE 2

|  | Particle size of two-layer polymer (Å) | Solvent resistance (sec) | MI (g/10 min) | Tensile strength (kg/cm$^2$) | HDT (°C.) | Surface state of molded product |
| --- | --- | --- | --- | --- | --- | --- |
| Example 5 | 2910 | 478 | 0.7 | 731 | 103 | ◯ |
| Example 6 | 3700 | 640 | 0.8 | 705 | 102 | ◯ |
| Comparative Example 4 | 6600 | 187 | 0.7 | 564 | 103 | x |

EXAMPLES 7 AND 8 AND COMPARATIVE EXAMPLE 5

Two-layer polymers having a particle size as shown in Table 3 were prepared in the same manner as in (a) of Example 1 except that the ratio of amount of monomers in the inner layer and the outer layer was changed as shown in Table 3.

Thereafter, the procedure of Example 3 was repeated.

The results are shown in Table 3.

TABLE 3

|  | Two-layer polymer Inner layer/outer layer | Particle size (Å) | Solvent resistance (sec) | MI (g/10 min) | Tensile strength (kg/cm$^2$) | HDT (°C.) | Surface state of molded product |
| --- | --- | --- | --- | --- | --- | --- | --- |
| Example 7 | 50/50 | 1100 | 295 | 0.9 | 525 | 102 | ◯ |
| Example 8 | 80/20 | 1300 | 34 | 1.2 | 509 | 102 | ◯ |
| Comparative | 100/0 | 1040 | 16 | 1.3 | 247 | 101 | ◯ |

TABLE 3-continued

| Two-layer polymer | | Solvent | MI | Tensile | | Surface state |
|---|---|---|---|---|---|---|
| Inner layer/ outer layer | Particle size (Å) | resistance (sec) | (g/10 min) | strength (kg/cm²) | HDT (°C.) | of molded product |
| Example 5 | | | | | | |

EXAMPLE 9

(a) Preparation of Acrylic Rubber

Acrylic rubber having three-layer structure was prepared in accordance with the process described in Japanese Patent Kokoku (Post Exam. Publn.) No. 55-57576. 1700 g of deionized water, 0.7 g of sodium carbonate and 0.3 g of sodium persulfate were charged in a 5 liter reaction vessel made of glass and were stirred under nitrogen stream. Thereafter, 4.46 g of PELEX TO-P (surface active agent manufactured by Kao Co., Ltd.), 150 g of deionized water, 510 g of MMA, and 0.3 g of AMA were further charged therein and then, heated to 75° C and stirred for 150 minutes.

Successively, a mixture of 689 g of BA, 162 g of ST and 17 g of AMA and a mixture of 0.85 g of sodium persulfate, 7.4 g of PELEX TO-P and 50 g of deionized water were added respectively from separate inlets over a period of 90 minutes and polymerization was allowed to proceed for further 90 minutes.

After completion of the polymerization, a mixture of 326 g of MMA and 14 g of EA and 30 g of de-ionized water containing 0.34 g of sodium persulfate dissolved therein were added respectively from separate inlets over a period of 30 minutes. After completion of the addition, the content was kept for further 60 minutes to complete the polymerization. The resulting polymer had a particle size of 3800 Å. The resulting latex was introduced into a 0.5% aqueous aluminum chloride solution to coagulate the polymer. This was washed with warm water 5 times and dried to obtain an acrylic rubber.

(b) Preparation of Rubber Modified Methacrylic Resin Composition

A rigid acrylic resin powder having a molecular weight of 90000 which was obtained by suspension polymerization of 96% by weight of methyl methacrylate and 4% by weight of ethyl acrylate by normal suspension polymerization and the acrylic rubber obtained in the above (a) were mixed at a weight ratio of 60:30 by a Henschel mixer, and then, were pelletized by melt mixing using a vented screw-type extruder at 220-270° C.

(c) Preparation of Methacrylic Resin Composition

90 Parts by weight of the rubber modified methacrylic resin obtained in the above (b) and 10 parts by weight of the two-layer polymer obtained in (a) of Example 1 were mixed by a Henschel mixer and were pelletized by melt mixing using a vented screw-type extruder at a cylinder temperature of 220-270° C. The pellets were dried at 80° C. for 5 hours and then, molded into a given dumbbell by an injection molding machine at 240° C. and the dumbbell was evaluated. The results of evaluation are shown in Table 4.

EXAMPLES 10-12

Example 9 was repeated except that the two-layer polymer obtained in (a) of Example 1, the rigid methacrylic resin powder used in (b) of Example 1 and the acrylic rubber obtained in (a) of Example 9 were mixed at a ratio as shown in Table 4. The resulting methacrylic resin composition was evaluated and the results are shown in Table 4.

COMPARATIVE EXAMPLE 6

Example 9 was repeated except that the ratio of rigid acrylic resin powder and acrylic rubber in (b) was 80:20 and the methacrylic resin composition contained no two-layer polymer. Result of evaluation is shown in Table 4.

TABLE 4

| | Rigid methacrylic resin | Acrylic rubber | Two-layer polymer | Solvent resistance (sec) | MI (g/10 min) | Tensile strength (kg/cm²) | Izod impact strength (kg · cm/cm) | HDT (°C.) |
|---|---|---|---|---|---|---|---|---|
| Example 9 | 60 | 30 | 10 | 37 | 0.6 | 480 | 5.8 | 98 |
| Example 10 | 60 | 20 | 20 | 113 | 0.4 | 550 | 4.9 | 99 |
| Example 11 | 60 | 10 | 30 | 600 | 0.3 | 640 | 2.1 | 101 |
| Example 12 | 80 | 10 | 10 | 156 | 1.4 | 630 | 2.4 | 101 |
| Comparative Example 6 | 80 | 20 | 0 | 21 | 2.5 | 540 | 4.6 | 99 |

EXAMPLE 13

(a) Preparation of the Rubber Modified Methacrylic Resin

A methacrylic resin modified with a butadiene rubber was prepared in accordance with the process described in Japanese Patent Kokai (Laid-Open) No. 55-147514.

First, a syrup comprising 8 parts by weight of polybutadiene rubber, 20 parts by weight of styrene and 72 parts by weight of methyl methacrylate was prepared in accordance with the process of Example 1 of the above Japanese patent laid-open publication.

A polymer was prepared using the syrup by suspension polymerization in accordance with the process described in Reference Example 1 of the above Japanese patent laid-open publication.

(b) Preparation of the Methacrylic Resin Composition

Example 9 was repeated except that 70 parts by weight of the above rubber modified methacrylic resin and 30 parts by weight of the two-layer polymer of (a) of Example 1 were used in (c) of Example 9. The results are shown in Table 5.

COMPARATIVE EXAMPLE 7

Only the rubber modified methacrylic resin of the above Example 13 was evaluated. The results are shown in Table 5.

TABLE 5

|  | Example 13 | Comparative Example 7 |
|---|---|---|
| Particle size of two-layer polymer (Å) | 1380 | — |
| Solvent resistance (sec) | 466 | 22 |
| MI (g/10 min) | 0.3 | 1.1 |
| Tensile strength (kg/cm$^2$) | 600 | 540 |
| Izod impact strength (kg · cm/cm) | 6.7 | 8.2 |
| HDT (°C.) | 104 | 104 |

What is claimed is:

1. A methacrylic resin composition which comprises a mixture of 20-99 weight percent of methacrylic resin and 1-80 weight percent of methacrylic two-layer polymer consisting essentially of an inner layer and an outer layer, said polymer being specified by the following (a)-(d):
    (a) the inner layer being obtained by polymerizing 90-99.9 weight percent of a monofunctional monomer and 0,1-10 weight percent of a polyfunctional monomer, said monofunctional monomer being composed of at least about 60% by weight of methyl methacrylate and other copolymerizable ethylenic unsaturated monomers,
    (b) the outer later being obtained by polymerizing a monofunctional monomer composed of at least about 70% by weight of methyl methacrylate and other copolymerizable ethylenic unsaturated monomers in the presence of the inner layer,
    (c) the weight ratio of the inner layer and the outer layer being 1:9-9:1, and
    (d) the glass transition temperature of each of the inner layer and the outer layer being 50-120° C.

2. A methacrylic resin composition according to claim 1, wherein the methacrylic resin is a copolymer comprising at least 70 weight percent of methyl methacrylate and other ethylenic unsaturated monomer copolymerizable therewith.

3. A methacrylic resin composition according to claim 1, wherein the methacrylic resin is a rubber modified methacrylic resin containing an acrylic rubber or a butadiene rubber.

4. A methacrylic resin composition according to claim 1, wherein the mixture comprises 50-90 weight percent of the methacrylic resin and 5-50 weight percent of the methacrylic two-layer polymer.

5. A methacrylic resin composition according to claim 1, wherein the methacrylic resin two-layer polymer is specified by the following (a)-(d):
    (a) the inner layer being obtained by polymerizing a monofunctional monomer and contains 0.2-5 weight percent of a polyfunctional monomer, said monofunctional monomer being composed of at least about 60% by weight of methyl methacrylate and other copolymerizable ethylenic unsaturated monomers,
    (b) the outer layer being obtained by polymerizing a monofunctional monomer composed of at least about 70% by weight of methyl methacrylate and other copolymerizable ethylenic unsaturated monomers in the presence of the inner layer,
    (c) the weight ratio of the inner layer and the outer layer being 1:9-9:1, and
    (d) the glass transition temperature of each of the inner layer and the outer layer being 80-120° C.

* * * * *